United States Patent [19]
Bredemeier

[11] 3,796,220
[45] Mar. 12, 1974

[54] STEREO LASER ENDOSCOPE

[76] Inventor: Herbert C. Bredemeier, 5 Bridle Path, Sherborn, Mass. 01770

[22] Filed: Mar. 24, 1972

[21] Appl. No.: 237,790

[52] U.S. Cl. ............................. 128/303.1, 128/395
[51] Int. Cl. ............................................ A61b 17/36
[58] Field of Search ....... 128/303.1, 395, 6; 350/35, 350/36, 91; 331/94.5

[56] References Cited
UNITED STATES PATENTS

| | | | |
|---|---|---|---|
| 3,703,176 | 11/1972 | Vassiliadis et al. | 128/395 |
| 3,424,518 | 1/1969 | Sato et al. | 350/35 X |
| 3,642,007 | 2/1972 | Roberts et al. | 128/395 |
| 3,487,835 | 1/1970 | Koester et al. | 128/303.1 |
| 3,463,594 | 8/1969 | Myer | 350/36 UX |
| 3,533,707 | 10/1970 | Weiss | 350/91 |

Primary Examiner—Lawrence W. Trapp
Attorney, Agent, or Firm—Lane, Aitken, Dunner & Ziems

[57] ABSTRACT

A converging laser operating beam is directed to a target site by a gimbal mounted mirror having a pair of apertures through which the work site is viewed simultaneously by a stereo microscope. To locate the focal point of the operating beam, diverging light from a marker light point source is reflected back through the microscope by reflective means mounted over the apertures on the mirror. The marker light provides a virtual image which appears to the viewer as a spot coincident with the focal point of the operating beam. A joy stick is mechanically linked to the mirror so that the beam, along with the marker light spot, may be steered to any desired location within a few degrees of the central optical axis of the microscope. Means are also provided for using a conventional stereo microscope's self-contained light source for the marker light source.

35 Claims, 12 Drawing Figures

STEREO LASER ENDOSCOPE

BACKGROUND OF THE INVENTION

The invention relates generally to the field of laser microsurgery, and more particularly to optical apparatus for directing a focused laser beam to a target site while providing a microscopic view of the work area.

In the past, highly focused laser beams have been used clinically, for example, for treatment of the eye by photo-coagulation. As a precise cutting tool, the laser is finding many new applications in the field of medical research. Because laser light can be highly focused, the laser beam is capable of performing surgery at microscopic dimensions in areas, such as the inner ear, which were formerly inaccessible to conventional surgical instruments. There is, therefore, a growing demand for laser equipment with which the surgeon can safely and efficiently utilize the laser.

In former laser instrumentation, many problems have been encountered in attempting to meet the surgion's need for precise location and control of the focused laser beam. If the focused spot size is on the order of 100 microns, of course, the work site must be viewed with a microscope to correctly position the spot and follow the process of the surgery. It has been found that the site can be viewed directly through a beam splitter arranged to reflect a portion of the laser energy to the target site. Besides needlessly obstructing the surgion's view and subtracting from the deliverable beam power, prior systems employing this principle have tended to detract from the desired maneuverability of the focused laser beam. Since the beam splitter and microscope were rigidly connected to each other, and in some manner to the source of laser energy, moving the laser spot to a specific neighboring location required moving the microscope as well as the beam splitter, and was therefore an extremely delicate task whose difficulty was wholly disproportionate to the degree of maneuverability normally required. In all of the known prior systems a visible marker light was used to pre-locate the position of the laser spot before applying maximum energy to the target site. The marker systems all required at least one auxiliary light beam to be focused on the work site coincidentally with the normal focal point of the laser beam. Many employed complicated shutter systems to temporarily introduce a marker light coaxially with the laser beam path. When moving the spot to a new location, the marker system usually had to be moved, too. In short, the complex prior art systems, because of their bulk and lack of flexibility, were unsuitable for delicate operations requiring confident, precisely controlled manipulation of the laser spot.

SUMMARY OF THE INVENTION

Accordingly, one of the objects of the invention is to provide improved means for viewing the work site along the optical axis of the laser operating beam. Another object of the invention is to provide a binocular viewing system which does not interfere with the operating beam. A further object of the invention is to provide means for changing the orientation of the laser beam with respect to the viewing system in order to select a neighboring target site within the stationary field of view. Still another object of the invention is to provide a continuous marking system using a virtual image which follows the location of the focal point of the laser beam and interferes minimally with the surgeon's view.

The applicant has discovered that these and other objects of the invention are accomplished by directing a converging laser operating beam to a work site by a gimbal mounted mirror having a pair of apertures through which the work area is viewed simultaneously with a conventional stereo operating microscope. The two apertures are centered respectively on the converging stereo axes of the microscope so that the microscope's normal field of view is unobstructed. The laser beam is reflected downwardly by the mirror from a point between the two apertures along the central optical axis (the bisector of the stereo axes) of the microscope towards the work area.

A marker system is provided to indicate the location of the laser beam. A marker light point source is located facing the other side of the mirror opposite the impinging laser beam. A converging lens system is interposed between the marker light source and the mirror to make the light source appear as if it were located at the working distance of the microscope. Means are disposed in each of the two apertures in the mirror to reflect the marker light into the microscope objective from the same plane as that from which the impinging laser beam is reflected to the target site. With proper adjustment, the virtual image of the marker light point source therefore appears to the surgeon to be located coincidentally with the focal point of the laser beam. In one embodiment, the reflecting means in the mirror apertures are formed by placing beam splitters over the apertures on the same side from which the laser beam is reflected. In another embodiment, a fully reflective surface covers a small portion of each aperture and lies in the same plane as the laser beam reflecting surface between the apertures.

To provide flexibility in locating the focal point of the laser beam with respect to the subject, without actually moving the subject or the stereo microscope, means are provided for changing the orientation of the exiting laser beam, and concomitantly the orientation of the marker image, within a few degrees of the central optical axis of the stationary microscope in any direction. The apertured mirror is mounted in a gimbal assembly having two orthogonal axes of rotation. A single control handle, which operates like an airplane "joy stick," is mechanically linked to the gimbal assembly to provide sensitive, control rotation about either of the gimbal axes, separately or simultaneously. The resulting movement of the focal point of the laser beam, and the virtual image of the marker source, is proportional to and in the same sense as the movement of the joy stick.

In another embodiment, the separate marker light source is replaced by the internal light source of a conventional stereo microscope. To accomplish this, the marker point source is formed by one end of a fiber optic light guide whose other end is located adjacent to the mirror for receiving light generated internally by the microscope. At the same time, the microscope's light source also serves its intended function of illuminating the operating site.

While the laser beam directing and viewing system is applicable to external surgery, the system finds its greatest use and advantage in endoscopic operations, for which the system is adapted by enclosing the optical path to the work site with an appropriate tubular or conical sheath permitting insertion of the instrument.

DESCRIPTION OF THE PREFERRED EMBODIMENTS

Figure 1:
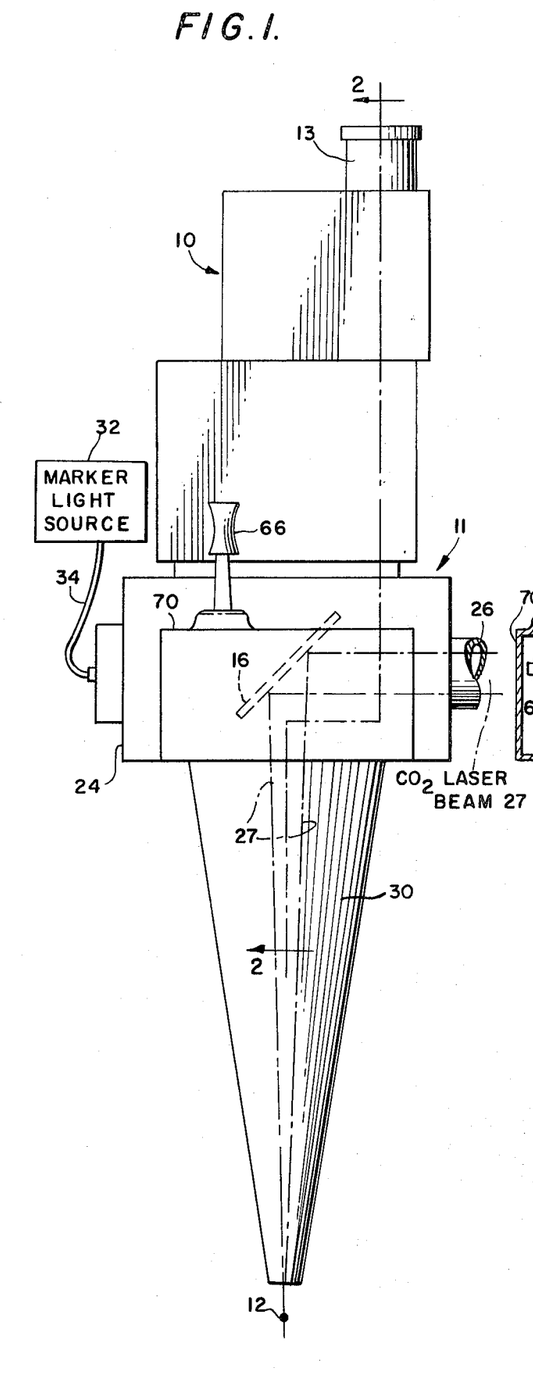
FIG. 1 is a side view of an embodiment of the stereo laser endoscope according to the invention, illustrating the relative locations of the laser beam, marker light source, gimbal mounted mirror, and joy stick control.
Figure 2:
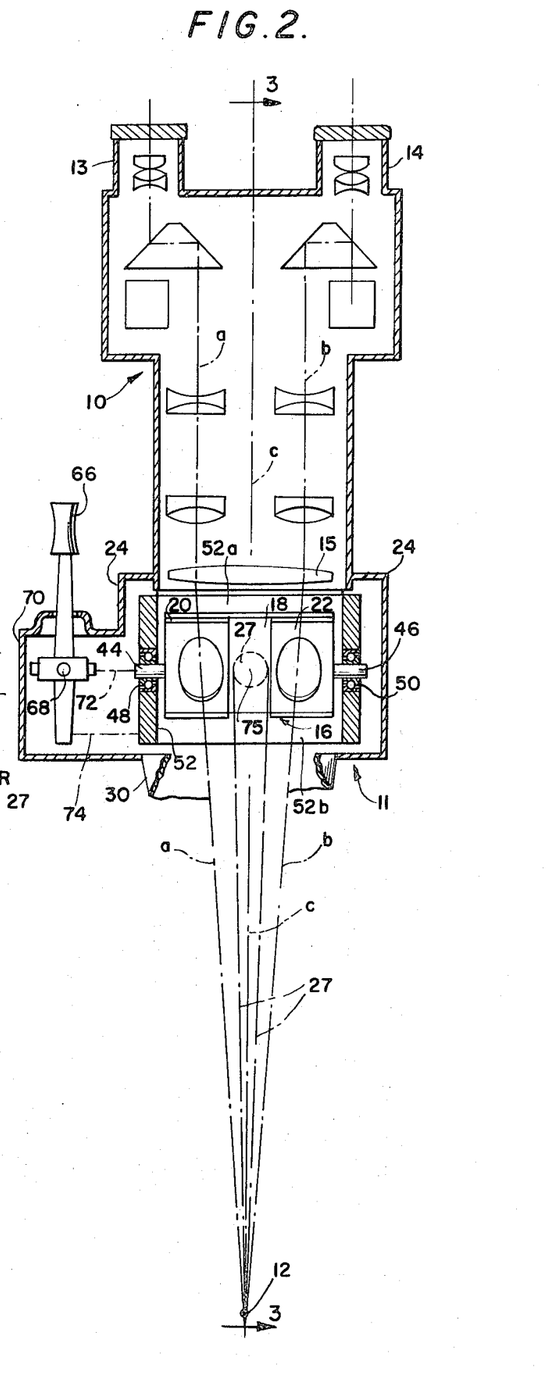
FIG. 2 is a sectional view taken along lines 2—2 of FIG. 1 illustrating in particular the gimbal assembly for the mirror.
Figures 3, 4, 5, 6:
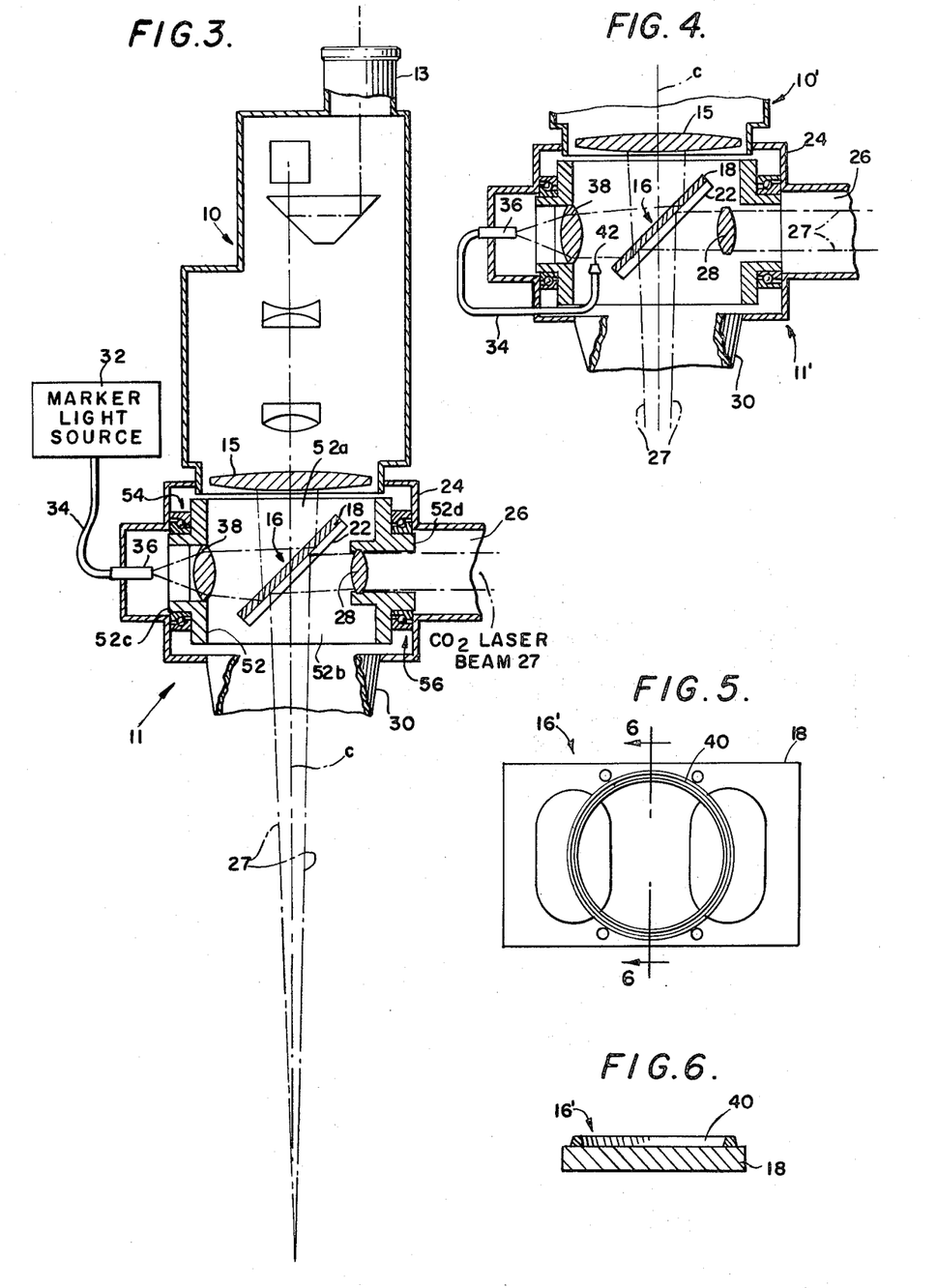
FIG. 3 is a sectional view taken along lines 3—3 of FIG. 2 illustrating the optical system in more detail.
FIG. 4 is a sectional view similar to that in FIG. 3 illustrating an alternate embodiment of the marker system.
FIG. 5 is a plan view of an alternative embodiment of the mirror assembly illustrated in FIG. 2.
FIG. 6 is a cross-sectional view taken along lines 6—6 of FIG. 5.

A conventional binocular or stereo operating microscope 10 is shown in FIGS. 1, 2 and 3 with an endoscopic laser accessory 11 enabling an unhindered view of a work site 12 while laser energy is applied thereto at a controlled location indicated by a marker system, explained in detail below. As shown in FIG. 2, the microscope 10 has a pair of separate optical systems with respective eye pieces 13 and 14 at one end and a common objective lens 15 at the other end. Because of the separate optical systems, the microscope 10 has two optical axies, referred to hereinafter as stereo axes a and b. The stereo axes a and b converge from the objective lens 15 of the microscope 10 toward the focal plane of the microscope at the work site 12. Since the object under observation is viewed from two different angles, as in normal sight, the stereo microscope 10 provides depth perception, which, of course, is unattainable with a monocular microscope. For this reason, the stereo microscope is highly preferred in delicate surgery.

An apertured mirror assembly 16 is arranged obliquely beneath the objective lens 15 on the microscope's central optical axis $c$, which is defined at the bisector of the converging stereo axes $a$ and $b$. The mirror assembly 16 comprises a rectangular plate 18 having a pair of spaced apertures through which the respective stereo axes $a$ and $b$ pass. The central portion of the side of the plate 18, visible in FIG. 2, is covered with a fully reflective substance, preferably gold for reflecting infrared energy. The apertures are covered respectively with semitransparent beam splitters 20 and 22, made of fused silica, for example, secured to the plate 18.

As shown in FIGS. 1 and 3, the mirror assembly 16 is mounted in a housing 24 having an opening 26 on one side through which a laser beam 27 is introduced perpendicularly to the central axis $c$ of the microscope 10. A suitable beam of infrared energy, highly absorbable by biological tissues, is produced by a $CO_2$ gas laser (not shown). The opening 26 can be directly aligned with the laser source, or the beam can be conveyed to the opening by reflective means (not shown). A converging lens 28 is aligned between the mirror assembly 16 and the opening 26. The mirror assembly 16 is arranged such that the laser beam 27, after passing through the lens 28, is deflected from the reflective central portion of the plate 18 downwardly along the microscope's central axis $c$ towards the work site 12. The lens 28 is chosen such that the laser beam 27 is focused to a point lying in the focal plane of the microscope 10, i.e., at the "working distance" of the microscope.

For endoscopic surgery, a conical sheath 30 (FIG. 1) may be attached at its larger end to the underside of housing 25 in alignment with the central axis $c$. The sheath 30 encloses the stereo axes $a$ and $b$ and the converging laser beam 27 and permits insertion of the instrument into recessed portions of the subject.

As shown in FIG. 1 and 3, a marker system is provided to indicate the precise location of the focal point of the laser beam 27. The marker system is especially necessary when using a $CO_2$ laser beam since the infrared, focused spot, although intense, is invisible to the human eye. When a visible laser beam is employed as the operating beam 27, the marker system can be used to predict the point of impact of the beam before the beam is applied. Light from a marker light source 32, which in its simplest form would be a box with an incandescent bulb, is introduced through housing 24 by means of an extremely thin (e.g. one strand) fiber optic light guide 34. One end of the light guide 34 is positioned to receive light from the marker source 32. The light guide emitting end 36 is adjustably fixed in housing 24 and extends inwardly directly opposite the opening 26 axially aligned with the incoming laser beam 27. The emitting end 36 forms a point source producing diverging light rays which are incident on the side of the mirror plate 18 facing the microscope 10. A converging lens 38 is mounted between the light emitting end 36 and the mirror assembly 16. A portion of the marker light incident on the mirror assembly 16 falls within the apertures and is reflected by the inner sides of the beam splitter 20 and 22 (FIG. 2), upwardly into the microscope objective 15 along the stereo axes $a$ and $b$. The lens is chosen such that the marker light reflected to the microscope 10 is correctly divergent to produce a virtual image of the point source formed by the light guide emitting end 36 coincident with the focal point of the laser beam. In effect, the lens 38 makes the end 36 appear as if it were at the same distance from the assembly 16 as the target site 12. The surgeon viewing the site 12 through the microscope 10 will see a spot of light which appears to be coincident with the invisible focal point of the laser beam, while the actual source of the marker spot is the light guide emitting end 36. To insure coincidence of the laser focal point and the marker spot as viewed through the microscope 10, it is important that the marker light and laser beam 27 be reflected in opposite directions from approximately the same plane in the mirror assembly 16. Coplanar reflections are provided by the embodiment of FIGS. 1-3 because the marker light is reflected from the inner surface of the beam splitter 20, 22 covering each aperture. The inner surface of each beam splitter is substantially coplanar with the central reflective surface of the plate 18 from which the laser beam is reflected.

In an alternate embodiment 16' of the mirror assembly 16, in FIGS. 5 and 6, the beam splitters 20 and 22 are replaced by a ring 40 having a trapezoidal cross-section. The larger flat side of the ring 40 is fully reflective and is cemented to the laser beam reflecting side of the mirror plate 18. The ring 40 is centered between the apertures and has a diameter such that opposite portions of the ring 40 cross over the respective apertures. A portion of the marker light shining on the opposite side of the mirror assembly 16' as viewed in FIG. 5, is incident on the fully reflective surface of the ring portion transversing each aperture and is reflected back towards the microscope 10. Only a small percentage of the area of each aperture is obstructed by the ring 40. Therefore, a larger portion of light is transmitted directly through the aperture from the operating site to the microscope 10 than that which is usually obtained with beam splitters 20 and 22 (FIG. 2). Of course, the marker light source 32 must be of sufficient intensity so that the amount of light reflected by the ring 40 to the microscope 14 is sufficient to produce a visible marker spot image. The trapezoidal configuration for the ring cross-section is chosen to reduce the area obscured by the ring in each aperture as viewed from the microscope 10. The portions of the ring 40 which do not lay over the apertures are unnecessary optically and are used merely to support the portions of the ring 40 exposed in the apertures. The ring 40 can therefore be replaced with a pair of flat reflective bars spanning each aperture, if desired. The integral ring 40 is preferred, however, since it facilitates manufacture and assembly of the mirror assembly 16'.

In the alternate embodiment of FIG. 4, the separate marker light source 32 is eliminated. Instead, the internal light source (not shown) of a conventional stereo operating microscope 10' is employed. The receiving end of the fiber optic light guide 34 is re-routed through a lower opening in the housing 24. The light guide 34 terminates in a receiving end 42 having a small light collecting lens system located between the lower edge of the mirror assembly 16 (or 16') and the adjacent end of the lens 38 in the path of the light beam from the microscope. It has been found that a sufficient portion of the light from the microscope's internal source is present at the designated location of the receiving end 42 to provide light of sufficient intensity at the emitting end 36 to form the marker point source. The receiving end 42 blocks only a small portion of the light allowing the remainder to pass to the target site as intended. The structural requirements of the laser endoscope are significantly reduced by this unique configuration. Further details of this marker system are explained below in connection with FIGS. 10–12.

As shown in FIGS. 2 and 3, the mirror assembly 16 (or 16') is mounted in a gimbal assembly within the housing 24 having two orthogonal axes of rotation which permit selective universal orientation of the assembly 16. A pair of axles 44 and 46 are formed on opposite ends of the mirror assembly 16 for rotation thereof about a central longitudinal axis running through the centers of both apertures in the plate 18. The axles 44 and 46 are rotatably received in respective bearings 48 and 50 formed on opposite sides of a box-shaped outer gimbal 52. The upper and lower ends 52a and 52b of the outer gimbal 52 are open, or at least transparent, to allow passage of light to the microscope 10 and transmission of the laser beam 27 to the work site 12. The mirror assembly 16, rotatable within the outer gimbal 52, forms the inner gimbal.

The outer gimbal 52 is mounted for rotation within the housing 24, as shown in FIG. 3. Annular neck portions 52c and 52d are formed on either side of the outer gimbal 52. The outer surface of the neck portions 52c and 52d serve as axles and are received in bearings 54 and 56, respectively, located in the housing 24 such that the open center portion of neck 52d is aligned with the opening 26 in the housing 24 so that the laser beam 27 can be directed toward the mirror assembly 16. The axis of rotation for the outer gimbal 52 may thus be thought of as a line connecting the respective centers of neck portions 52c and 52d. This rotational axis is perpendicular to the axis formed by axles 44 and 46 for the mirror assembly 16, as can be seen by comparing FIGS. 2 and 3.

The gimbal mounted mirror assembly 16 is designed to be mechanically oriented by manipulating a handle or joy stick 66, shown schematically in FIG. 2. The joy stick 66 is mounted for universal, pivotal movement about a point 68 in a housing 70 adjoining the gimbal assembly housing 24. The joy stick 66 is connected by a mechanical linkage 72 to the mirror axle 44 so that pivotal movement of the joy stick 66 in a plane perpendicular to the plane of the paper in FIG. 2 causes proportional rotation of the mirror assembly 16 on its axles 44 and 46 without changing the orientation of the outer gimbal 52. The joy stick 66 is also connected to the outer gimbal 40 through a mechanical linkage 74 such that pivotal movement of the joy stick 66 in the plane of the paper causes rotation of the outer gimbal 52 about its axis of rotation, which is perpendicular to the paper of FIG. 2 and is designated by point 75. Oblique movement of stick 66 in a direction having both parallel and perpendicular components resulting in corresponding proportional rotation of both the mirror assembly 16 and the other gimbal 52 causing a complete reorientation of the mirror gimbal assembly with respect to the microscope 10. The linkages 72 and 74 are designed to move the position of the focal point of the reflected laser beam 27 approximately in proportion to and in the same sense or direction as movement of the stick 66. The object is to allow the positioning of the focused laser spot anywhere within a predetermined radius from the center of the fixed area which comprises the microscope's field of view. As the orientation of the mirror assembly 16 is changed, the virtual marker image of the light guide end 36 (FIG. 3) follows the changing location of the beam focal point because the laser beam 27 and the marker light are reflected from the same plane, although in opposite directions. It has been found in a device constructed according to the invention that the preferred limits on the gimbal motion produced by the joy stick 66 permit the laser beam to be steered to any desired location within ±3° of the microscope's central axis c. The diameter of the working area within which the laser beam may be focused is therefore about one-tenth of the working distance from the microscope objective 15 to the work site 12.

Figure 7:
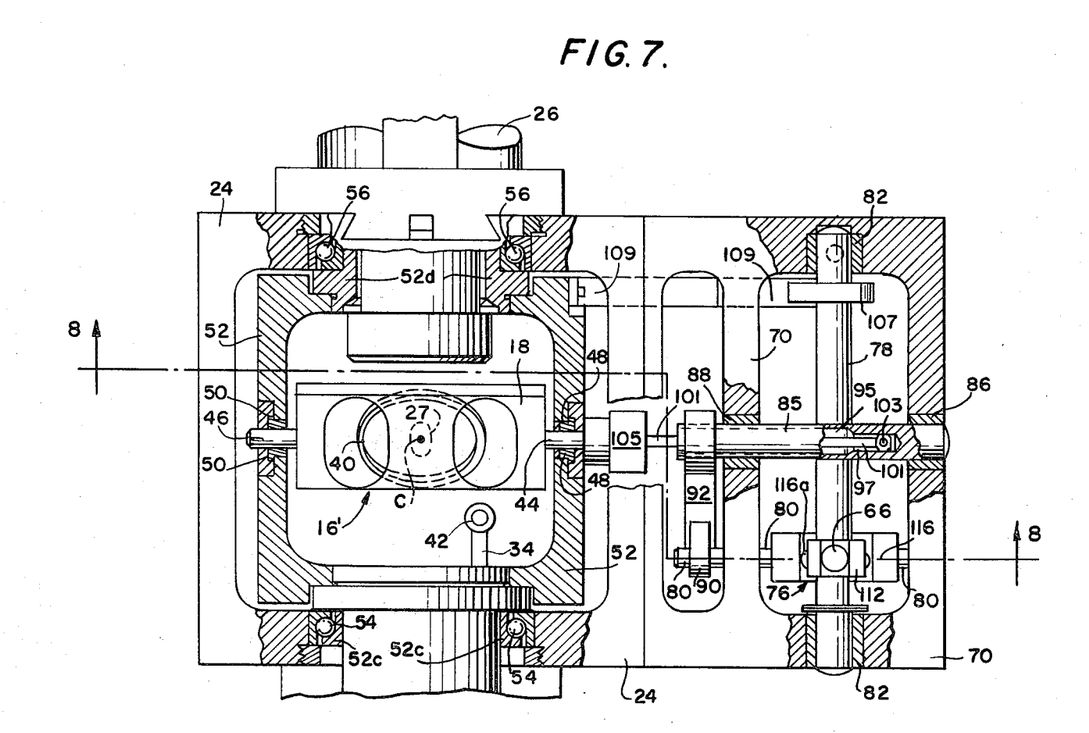
FIG. 7 is a plan view with portions broken away illustrating an embodiment of the mechanical linkage between the joy stick and the mirror gimbal assembly of FIG. 2.
Figure 8:
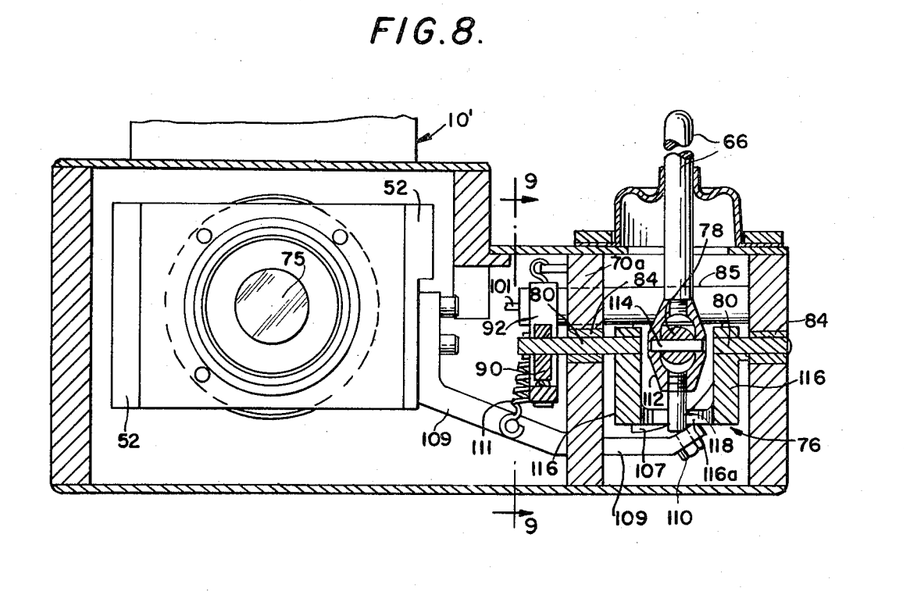
FIG. 8 is a sectional view taken along lines 8—8 of FIG. 7 illustrating in particular the mounting arrangement for the joy stick.
Figure 9:
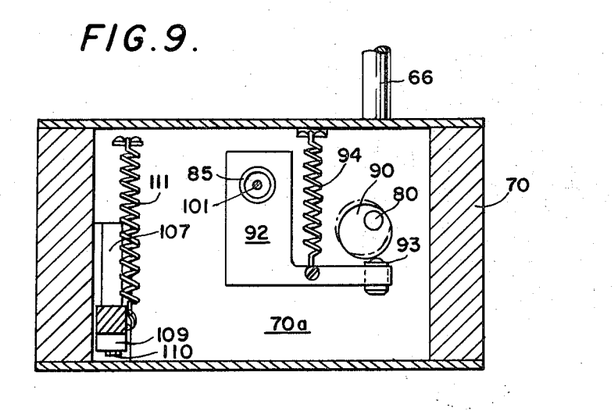
FIG. 9 is a sectional view along lines 9—9 of FIG. 8 showing in particular the cams and crank arms of the mechanical linkage for moving the gimbal assembly.

An embodiment of the mechanical linkages between the joy stick 66 and the gimbal assembly is illustrated in FIGS. 7, 8 and 9. The joy stick 66 is connected to a pair of intersecting, orthogonal shafts 78 and 80 rotatably mounted in the housing 70 by means of respective bearings 82 and 84 (FIG. 8). The shaft 78 is parallel to the axis of rotation of the outer gimbal 52 and the shaft 80 is parallel to the nominal axis of rotation for the mirror assembly 16'. One end of the shaft 80 extends through a vertical wall 70a inside housing 70 parallel to shaft 78. The stick 66 is connected by means of a universal gimbal joint 76 to shafts 78 and 80 such that movement of the stick 66 strictly perpendicular to one of the shafts 78, 80, rotates that shaft alone while the other shaft remains stationary.

An auxiliary shaft 85 spaced from the parallel to the shaft 80 is mounted for rotation above the shaft 78 in nominal alignment with the axle 44 of the mirror assembly 16'. Auxiliary shaft 85 is mounted at one end in a bearing 86 formed in the outer wall of the housing 70. The shaft 85 extends through another bearing 88 formed in the middle wall 70a. As shown in FIG. 9, a disc shaped cam 90 is eccentrically mounted on the end of the parallel shaft 80. An L-shaped crank 92 is rigidly connected at one end to the shaft 85. The other end of the crank 92 has an adjustment screw 93 serving as a cam follower. Resilient means 94 (shown only in FIG. 9) is connected between the crank 92 and the housing 70 to urge the adjustment screw 93 into contact with the cam 90. The cam and crank system connecting the shafts 80 and 85 causes proportional rotation to be induced in the shaft 85 in response to rotation of the shaft 80.

The auxiliary shaft 85 has a hollow open portion formed by a large axial bore 95 which terminates within the shaft in a slotted bore 94 of reduced diameter. A smaller shaft 101 is pivotally and slidably carried within the shaft 85. The shafts 101 and 85 thus form a telescoping shaft assembly. The end of the smaller shaft 101 connected to the shaft 85 terminates in a universal joint 103 slidably carried in the bore 97. The shaft 101 can pivot about the center of the joint 103 out of true axial alignment with the shaft 95. The joint 103 has axle pins formed on opposite sides which fit into corresponding longitudinal slots or grooves in the bore 97 so that the joint 103 and attached shaft 95 can move axially with respect to the auxiliary shaft 85. The sliding universal connection between the shafts 85 and 101 permits axial and angular displacement of the shaft 101 while retaining the ability to transmit rotation or torque from the shaft 85 to the smaller shaft 101. The other end of the pivoting shaft 101 is coupled through openings in the housing 70 and 24 to the axle 44 of the mirror assembly 16' by means of another universal joint 105, which transmits rotation irrespective of alignment between the pivoting shaft 101 and the mirror axle 44. Accordingly, rotation of the auxiliary shaft 85 produces precisely the same amount of rotation of the mirror assembly 16' about its longitudinal axis.

Another cam 107 is connected to the shaft 78. A crank 109 is rigidly connected to the side of the outer gimbal 52. The free end of the crank 109 is fitted with an adjustment screw 110 which serves as a follower for the cam 107. Resilient means 111 is connected between the crank 109 and the housing 70 to urge the adjustment screw 110 into contact with the surface of the cam 107. Thus, rotation of the shaft 78 by movement of the stick 66 in the plane of the paper of FIG. 8 causes corresponding rotation of the outer gimbal 52 about its axis perpendicular to the paper of FIG. 8 at point 75.

It should be carefully noted that rotation of the outer gimbal 52 about its axis out of its nominal position inherently causes angular misalignment of the axle 44 and shaft 85 and an increase in the distance between the universal joint 105 and the auxiliary shaft 85. This is the reason why the connecting shaft 101 is both pivottaly and slidably within the shaft 85. The shaft 101 should be as long as possible to minimize its required angular displacement. The use of the hollow shaft 85 in FIG. 7 accommodates a long shaft 101 while providing a compact arrangement for the cam and crank arm drive between parallel shafts 80 and 85.

The details of the universal gimbal mounting 76 for the joy stick 66 will now be described. The stick 66 is rigidly connected to a first gimbal member 112 (FIGS. 7 and 8) in the shape of a flat vertical plate with bevelled sides having an oval aperture centered directly below the stick 66. An axle 114 aligned with the shaft 80 extends rotatably through a transverse bore in the shaft 78 from one side to the other of the oval aperture in the first gimbal member 112. The shape of the aperture in the member 112 provides clearance for pivoting the joy stick 66 in a direction perpendicular to the paper of FIG. 8. The universal joint 76 includes a U-shaped second gimbal member 116 having parallel upright sides rigidly connected to the respective intermediate ends of the shaft 80. An elongated slot 116a is formed in the base portion of the second gimbal member 116. A pin 118, axially aligned with the joy stick 66 and rigidly connected to the bottom of the first gimbal member 112, extends through the slot 116a.

Movement of the joy stick 66 in the plane of the paper of FIG. 8 rotates the shaft 78 causing rotation of the outer gimbal 52, but has no effect on the shaft 80 since the pin 118 is free to travel within the elongated slot 116a between the parallel walls of the second gimbal member 116. On the other hand, perpendicular pivoting of the joy stick 66 has no effect on the shaft 78 but results in rotation of the shaft 80, thereby causing mutual rotation of the auxiliary shaft 85, the pivoting shaft 101 and finally the mirror assembly 16'. When the joy stick 66 is moved obliquely, both shafts 78 and 80 are rotated simultaneously causing the mirror assembly 16' to pivot about both of its gimbal axes at once.

Figures 10, 11, 12:
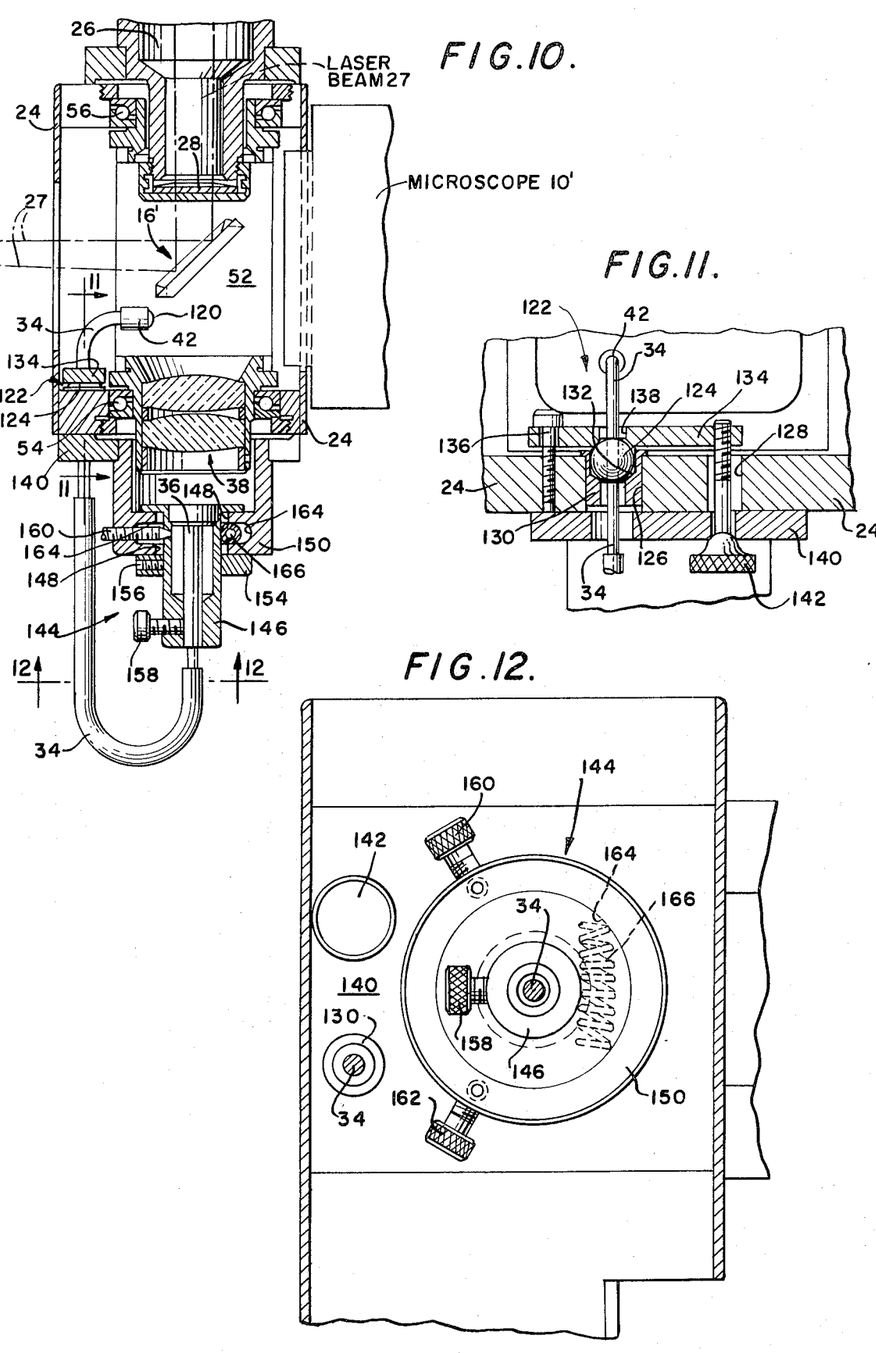
FIG. 10 is a sectional view similar to that of FIG. 4 illustrating the marker light system in more detail. In this view the laser beam and marker light systems are reversed and the entire structure is rotated 90° compared to FIG. 4.
FIG. 11 is a sectional view of the light guide receiving end adjustment assembly taken along lines 11—11 of FIG. 10.
FIG. 12 is an end view of the light guide emitting and alignment assembly taken along lines 12—12 of FIG. 10.

The marker system of FIG. 4, in which the microscope's self-contained light source is utilized, is shown in greater detail in FIGS. 10, 11 and 12. It should be noted that, while the arrangement is similar, the apparatus is shown in a different orientation in FIG. 10. However, for the sake of clarity, the same reference numbers as in FIG. 4 are used to identify the corresponding components in FIG. 10.

For proper optical alignment of the marker system, both ends 36 and 42 of the light guide 34 must be accurately positioned to achieve a bright point of light which appears to be perfectly coincident with the focal point of the laser beam 27. The light receiving ends 42 includes a small lens system 120 for connecting light from the microscope's internal source and concentrating it on the end of the fiber optic strand, which may be on the order of only 50 microns in diameter. The position and alignment of the end 42 is optimum when the maximum amount of light is concentrated on the end of the fiber optic strand. A ball and socket assembly 122 (FIGS. 10 and 11) allows universal adjustment of the receiving end 42. The light guide 34 passes through a central bore in a ball 124. The light guide 34 may be slidable in the ball 124 allowing axial adjustment or rigidly fixed thereto at the desired position. A pair of apertures 126 and 128 (FIG. 11) are formed through the side wall of the housing 24. A collar 130 is fitted into the aperture 126. One end 132 of the collar 130 is formed to serve as a portion of the bearing or socket for the ball 124. An elongated clamp plate 134 is fixed at one end to the inside of the housing 24 by a bolt 136 threaded into the housing wall on one side of the collar 130. The clamp plate 24 has an aperture 138 aligned with the housing aperture 126. The wall of the aperture 138 is bevelled on one side of the plate 134 to form the other portion of the socket for the ball 124. A plate 140 is secured to the outside of the housing 24 and has corresponding apertures aligned with apertures 126 and 128 of the housing. A tightening screw 142 extends through the plate 140 and housing aperture 128 on the other side of the collar 130. The end portion of the screw 142 is threadably received through the other end of the clamp plate 134. The head of the screw 140 bears against the plate 140. The ball 124 is thus retained in the socket formed by the collar 130 and clamp plate 134. By turning the screw 142, the plate 134 can be tightened down on the ball 124 to hold it in place. When the plate 134 is loosened slightly, the ball can be rotated. The channel through the outside plate 140, collar 130 and clamp plate 134 through which the light guide 34 extends should be sufficient diameter to provide clearance for different orientations of the light guide. Although the bent end of the light guide 34 adjacent to the ball 124 is rigid, at least a portion of the light guide, between the ball 124 and the point where the light guide reenters the housing (FIG. 10), must, of course, be flexible to permit adjustment. For example, the portion of the flexible fiber optic strand extending through the ball 124 may be carried within a rigid sheath or pipe, and the portion of the strand external to the housing 24 may be carried within flexible tubing.

The light emitting end 36 of the light guide 34 is received in an alignment assembly 144, shown in FIGS. 10 and 12, permitting adjustment in three dimensions. The axial adjustment increases or decreases the distance of the emitting end 36 from the lens assembly 38 for proper focus. Adjustments in a plane orthogonal to the axial direction permit coinciding alignment of the virtual image of the emitting end 36 and the focal point of the laser beam 27.

The light guide end 36 is coaxially and slidably received in a sleeve 146 extending through an oversized aperture 148 formed in a cylindrical housing 150 connected to the gimbal mirror housing 24 in coaxial alignment with the lens assembly 38. The sleeve 146 is axially held in the aperture 148 by means of an annular lip 152 formed at one end of the sleeve and an annular fitting 154 with a set screw 156 slidably receiving the sleeve 146 on the other side of the housing 150. A set screw 158 is threadably received in a transverse bore in the sleeve 146, external to the housing 150, to secure the light guide and end 36 at the desired axial position.

A three point adjustment system is used to position the sleeve 146 laterally within the oversized aperture 148. A pair of adjustment screws 160 and 162 (FIG. 12) are carried in respective, threaded, radial bores formed in the end of the housing 150. The screws 160 and 162 are separated angularly by about 120°, i.e., one-third of 360°. The end of each screw 160, 162 contacts a respective indentation on the sleeve 146. An annular groove 164 is formed coaxially in the sidewall of the oversized aperture 148. The groove 164 lies approximately in the same plane as the screws 160, 162, which therefore extend through the groove 164 to contact the sleeve 146. A helical spring 166 is positioned in a portion (e.g. about 90°) of the annular groove 164. The spring 166 contacts the sleeve 146 approximately at the mid-point along the spring's length. The point of contact should lie on the bisector of the angle between the screw 160 and 162 on the opposite side of the sleeve 146. The spring's resistance to being bent from the straight condition (rather than axially compressed) is employed to urge or bias the sleeve into contact with both screws 160 and 162. The diameter of the spring 166 should be less than the nominal radial distance between the outer surface of the sleeve 146 and the periphery of the groove 164. With this arrangement the sleeve can be accurately positioned laterally by turning either one, or both, of the screws 160 and 162. For example, if the screw 160 alone (FIG. 12) is turned, the sleeve will pivot laterally in a small arc about the end of the screw 162.

The alignment assembly 144 for the light emitting end 36 is equally applicable to the embodiment illustrated in FIG. 3, in which a spearate, external light source 32 is employed.

With reference to the mechanical linkage for the joy stick 66, any degree of demagnification of the movement of the mirror assembly 16' relative to the movement of the joy stick 66 can be accomplished by proper choice of the crank lengths (92, 109) and cam surfaces (90, 107). It has been found by experimentation that a proportionality constant or demagnification of seven to one for both gimbal axes results in both a high degree of flexibility and control.

Those skilled in the art will recognize that other mechanical means of connecting shafts 80 and 78 to the mirror gimbal assembly are possible. For example, pulley systems or gears could be used. However, the crank and cam arrangement is preferred since it eliminates lost motion or play in the linkage and permits only oneway transmission of rotation.

Instead of using a pivoting shaft 101 with a universal coupling to the axle 44 and a sliding universal connection to the auxiliary shaft 85, a flexible, torque transmitting cable, slidably carried in the shaft 85, can be directly connected to the axle 44. However, the arrangement using rigid shafts is preferred since it reduces the play between the axle 44 and shaft 85.

In the above apparatus the marker light and laser beam 27 are shown incident to the mirror assembly 16 at right angles to the microscope's central axis $c$. The mirror asssembly 16 (or 16') is therefore nominally oriented at 45° with respect to the axis $c$. Other normal orientations for the assembly 16 are feasible so long as the angles of incidence of the laser beam and marker light are changed accordingly. While the mirror unit 16 has been described above in connection with the preferred gimbal assembly and joy stick control, it may be useful in certain circumstances to eliminate the gimbal assembly, joy stick and mechanical linkage and mount the assembly 16 rigidly at a prescribed angle with respect to the axis c. This rigid mirror system would retain the advantage of direct viewing of the work site through the mirror apertures and the capability of locating the laser beam focal point by means of the marker system. If the marker system is not needed, beam splitters 20 and 22 or the ring 40 may also be eliminated.

The invention provides the capability of delivering laser energy at a distance while precisely locating the focused laser spot by means of a marker system prior to and during exposure and simultaneously viewing the work site directly through a stereo operating microscope stationary with respect to the work site. It is one of the central features of the invention that the stereo laser endoscope accessory can be attached to a conventional stereo operating microscope without modifying the microscope itself in any way. The conveniently mounted joy stick provides sensitivity and naturalness of adjustment which allow the surgeon to position the beam with confidence and precision.

It will be understood that various changes in the details, materials, steps and arrangements of parts which have been herein described and illustrated in order to explain the nature of the invention, may be made by those skilled in the art within the principle and scope of the invention as expressed in the appended claims.

What is claimed is:

1. Microsurgical apparatus, comprising a stereo microscope for viewing a work site along a pair of converging stereo axes, a reflecting surface positioned at the light receiving end of said microscope between said stereo axes and oriented to reflect a converging beam of energy toward said work site, and a plate mounted obliquely on the bisector of said stereo axes and having a pair of spaced apertures located such that said stereo axes pass through said apertures respectively, said reflective surface being formed between said apertures on a central portion of one side of said plate facing said work site.

2. The apparatus of claim 1, wherein said stereo axes pass substantially undeviated on either side of said reflecting surface.

3. The apparatus of claim 1, wherein said converging beam is an infrared laser beam.

4. The apparatus of claim 1, further comprising reflecting means connected to said one side of said plate over said apertures respectively for reflecting light from the plane of said one side of said plate along said stereo axes into said microscope.

5. The apparatus of claim 4, further comprising means for projecting a diverging beam of light at the other side of said plate such that said diverging beam is reflected from said apertures by said reflecting means into said microscope to form a virtual image indicative to the location of the point of impact of said converging beam at said work site.

6. The apparatus of claim 5, further comprising a light source for illuminating said work site, said projecting means including light guiding means having a light receiving end positioned to receive light from said light source and having a light emitting end positioned to project said diverging beam of light at said other side of said plate.

7. The apparatus of claim 6, wherein said light source is contained within said microscope.

8. The apparatus of claim 4, wherein said reflecting means over said apertures includes a pair of beam splitting elements covering at least a portion of each said aperture respectively.

9. The apparatus of claim 4, wherein said reflecting means over said apertures includes a fully reflective element covering only a portion of each said aperture.

10. The apparatus of claim 9, wherein said fully reflective element is a flat ring having one fully reflective side fixed to one side of said plate and having portions extending over each said aperture.

11. The apparatus of claim 10, wherein said flat ring has a tapered cross section whose width is greatest at said fully reflective side.

12. The apparatus of claim 1, wherein said reflecting surface is gimbal mounted.

13. The apparatus of claim 1, further comprising a gimbal assembly, said reflecting surface being mounted in said gimbal assembly for rotation about two orthogonal axes.

14. The apparatus of claim 13, further comprising a manual control member and means connecting said control member to said gimbal assembly for causing corresponding rotation of said reflecting surface in response to manipulation of said control member.

15. The apparatus of claim 1, further comprising an outer gimbal mounted for rotation about an axis and having means for allowing the introduction of said converging beam co-axially with respect to said rotational axis and for allowing the transmission of said converging beam toward said work site after deflection by said reflecting surface, said plate being pivotally mounted in said outer gimbal for rotation about an axis passing through both of said apertures perpendicular to said rotational axis of said outer gimbal.

16. The apparatus of claim 15, further comprising a manual control element and a mechanical linkage operatively connecting said control element to said plate and said outer gimbal for causing corresponding rotation of said plate and outer gimbal about their respective rotational axes in response to manipulation of said control element.

17. The apparatus of claim 16, wherein said linkage includes a universal assembly connected to said control element, a pair of intersecting orthogonal rotatable shafts operatively connected to said universal assembly such that pivotal movement of said control element about the geometric point of intersection of said orthogonal shafts is resolved by said universal assembly into rotation of each said shaft by an amount proportional to the corresponding orthogonal component of the movement of said control element, said pair of shafts each having a cam affixed thereto, a first arm having one end fixed to said outer gimbal and the other end urged into contact with said cam on one of said shafts, an auxiliary shaft parallel to the other of said shafts mounted for rotation, a second arm fixed at one end to said auxiliary shaft and having the other end urged into contact with said cam on said other shaft, and a rotational drive coupling connecting said auxiliary shaft with said plate at said rotational axes of said plate.

18. The apparatus of claim 17, wherein said rotational drive coupling includes a connecting element having one end coupled to said auxiliary shaft and axially movable with respect thereto and having the other end coupled to said plate.

19. The apparatus of claim 18, wherein said first and second reflective means include coplanar reflective surfaces rigidly connected to each other and mounted for rotation.

20. The apparatus of claim 17, wherein said rotational drive coupling includes a connecting shaft having a first universal joint at one end coupling said connecting shaft to said plate and having a second universal joint at the other end, said auxiliary shaft having a hollow portion terminating in a slotted bore, said second universal joint being slidably received in said slotted bore so that said auxiliary shaft transmits rotation through said connecting shaft to said plate regardless of misalignment of said rotational axis of said plate and said auxiliary shaft.

21. The apparatus of claim 17, wherein said first and second reflective means are movably mounted together such that displacement of said first reflective means causes corresponding displacement of said second reflective means and said virtual image follows the location of said focal point.

22. Optical apparatus, comprising a microscope providing a field of view for observing a work site, reflecting means positioned between said microscope and said work site, means for projecting a diverging beam of visible light at said reflecting means at an angle thereto such that said diverging beam is reflected toward said microscope to provide a virtual image marking a location within said field of view, said microscope being a binocular microscope having a pair of converging stereo axes, and a plate mounted obliquely on the bisector of said stereo axes and having a pair of spaced apertures located such that said stereo axes pass through said apertures respectively, said reflecting means being formed between said apertures on a central portion of one side of said plate facing said work site.

23. The optical apparatus of claim 22, wherein said reflecting means includes a beam splitting element positioned on one of said stereo axes.

24. The optical apparatus of claim 23, wherein said reflecting means includes another beam splitting element positioned on the other stereo axis.

25. The optical apparatus of claim 22, wherein said reflecting means includes a flat ring having one fully reflective side obliquely facing said microscope and positioned such that opposite portions of said ring lie adjacent to said stereo axes respectively.

26. The optical apparatus of claim 25, further comprising a fully reflective surface positioned between said stereo axes substantially coplanar with said fully reflective side of said ring for deflecting a converging beam of energy toward said work site, said virtual image being indicative of the location of the point of impact of said converging beam at said work site.

27. The optical apparatus of claim 22, further comprising a light source for illuminating said work site, said projecting means including light guiding measn having a light receiving end positioned to receive light from said light source and having a light emitting end positioned to form a point source for projecting said diverging beam of light at said reflecting means.

28. The optical apparatus of claim 27, wherein said microscope contains said light source.

29. Microsurgical apparatus, comprising a microscope providing a field of view for observing a work site, a first reflecting surface positioned between said work site and the light receiving end of said microscope for deflecting a beam of energy toward said work site such that the point of impact of said beam falls within said field of view, a second reflecting surface positioned between said work site and said light receiving end of said microscope obliquely facing said microscope, means for projecting a diverging beam of light at said second reflecting surface at an angle thereto such that said diverging beam is reflected toward said microscope to provide a virtual image indicative of the location of said point of impact, said microscope being a binocular microscope with a pair of converging stereo axes, said first reflecting surface being positioned between said stereo axes and said second reflecting surface being positioned on one of said stereo axes, and a plate mounted obliquely on the bisector of said stereo axes and having a pair of spaced apertures located such that said stereo axes pass through said apertures respectively, said first reflecting surface being formed between said apertures on a central portion of one side of said plate facing said work site.

30. The microsurgical apparatus of claim 29, wherein said microscope has a self-contained light source for illuminating said work site and said projecting means includes light guiding means having a light receiving end positioned to receive light from said self-contained source of said microscope and a light emitting end positioned to form a point source for projecting said diverging beam toward said second reflecting surface.

31. Microsurgical apparatus, comprising a stereo microscope providing a normally stationary field of view for observing a work site along a pair of converging stereo axes, a reflecting surface comprising a plate mounted obliquely on the bisector of said stereo axes and having a pair of spaced apertures located such that said stereo axes pass through said apertures respectively, said reflecting surface being formed between said apertures on a central portion of one side of said plate facing said work site, said reflecting surface being positioned to reflect a beam of energy toward said work site such that the point of impact of said beam falls within said field of view, and means for providing universal pivoting movement of said reflecting surface to change the location of said point of impact within said stationary field of view.

32. The apparatus of claim 31, wherein said means for providing universal movement includes a rotational mount providing said reflecting surface with two orthogonal axes of rotation.

33. The apparatus of claim 32, wherein said means for providing universal movement further includes a pivotally mounted control element and a linkage connecting said control element to said mount for causing corresponding pivotal movement of said reflecting surface in response to pivotal movement of said control element in any direction.

34. The apparatus of claim 33, wherein said linkages includes a universal assembly connected to said control element, a pair of intersecting othogonally mounted rotatable shafts operatively connected at their junction to said universal assembly such that pivotal movement of said control element about the geometric point of intersection of said shafts is resolved by said universal assembly into rotation of each said shaft by an amount proportional to the corresponding orthogonal component of the movement of said control element, said pair of shafts each having a cam affixed thereto, a first arm having one end connected to cause rotation of said reflecting surface about one of said orthogonal rotational axes and having the other end urged into contact with said cam on one of said shafts, an auxiliary shaft parallel to the other of said shafts mounted for rotation, a second arm fixed at one end to said auxiliary shaft and having the other end urged into contact with said cam on said other shaft, and a rotational drive coupling connected said auxiliary shaft with said reflecting surface for causing rotation of said surface about the other orthogonal rotational axis.

35. The apparatus of claim 34, wherein said rotational coupling is axially movable with respect to said auxiliary shaft.

* * * * *

UNITED STATES PATENT OFFICE
CERTIFICATE OF CORRECTION

Patent No. 3,796,220     Dated March 12, 1974

Inventor(s) Herbert C. Bredemeier

It is certified that error appears in the above-identified patent and that said Letters Patent are hereby corrected as shown below:

Column 1, line 21, "surgion's" should read --surgeon's--.

Column 1, line 29, "surgion's" should read --surgeon's--.

Column 4, line 57, "splitter" should read --splitters--.

Column 7, line 24, "the" should read --and--.

Column 9, line 21, "24" should read --34--.

Column 10, line 22, "screw" should read --screws--.

Column 11, line 62 "to" should read --of--.

Column 13, line 63, "measn" should read --means--.

Column 16, line 4, "nected" should read --necting--.

Signed and sealed this 1st day of October 1974.

(SEAL)
Attest:

McCOY M. GIBSON JR.
Attesting Officer

C. MARSHALL DANN
Commissioner of Patents